United States Patent
Chen et al.

(10) Patent No.: US 8,386,908 B2
(45) Date of Patent: Feb. 26, 2013

(54) DATA TRANSMISSION METHODS AND UNIVERSAL SERIAL BUS HOST CONTROLLERS UTILIZING THE SAME

(75) Inventors: Xingchen Chen, Taipei (TW); Jiin Lai, Taipei (TW); Di Dai, Taipei (TW); Shanna Pang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 281 days.

(21) Appl. No.: 12/872,526

(22) Filed: Aug. 31, 2010

(65) Prior Publication Data

US 2011/0119557 A1    May 19, 2011

(30) Foreign Application Priority Data

Nov. 13, 2009  (CN) .......................... 2009 1 0222079

(51) Int. Cl.
  *G06F 11/10*   (2006.01)
  *H03M 13/00*   (2006.01)

(52) U.S. Cl. ......... 714/807; 714/758; 714/781; 714/799

(58) Field of Classification Search .................. 714/758, 714/781, 799, 807
See application file for complete search history.

(56) References Cited

U.S. PATENT DOCUMENTS

| | | | |
|---|---|---|---|
| 6,192,498 B1* | 2/2001 | Arato | 714/781 |
| 2005/0204263 A1* | 9/2005 | Ricci | 714/758 |
| 2008/0148135 A1* | 6/2008 | Hughes et al. | 714/799 |
| 2008/0229174 A1* | 9/2008 | Miranda | 714/758 |

* cited by examiner

*Primary Examiner* — Sam Rizk
(74) *Attorney, Agent, or Firm* — McClure, Qualey & Rodack, LLP

(57) ABSTRACT

A data transmission method for a universal serial bus (USB) host controller is provided. First, input data is received. A cyclic redundancy check (CRC) result of the input data is calculated, and, simultaneously, the input data is transmitted to a system memory of a host. Then, it is determined whether the input data is the last input data of a data packet. When it is determined that the input data is the last input data of the data packet, the CRC result of the last input data of the data packet is calculated. Thus, the CRC result of the data packet is accumulated. The accumulated CRC result is combined with the last input data, and transmitted the combination to the system memory of the host.

13 Claims, 5 Drawing Sheets

DATA TRANSMISSION METHODS AND UNIVERSAL SERIAL BUS HOST CONTROLLERS UTILIZING THE SAME

CROSS REFERENCE TO RELATED APPLICATIONS

This Application claims priority of China Patent Application No. 200910222079.1, filed on Nov. 13, 2009, the entirety of which is incorporated by reference herein.

BACKGROUND OF THE INVENTION

1. Field of the Invention

The invention relates to a data transmission method and a universal serial bus (USB) host controller using the data transmission method, and more particularly to a method of performing data transmission between a USB device and a host, wherein a USB host controller performs the method.

2. Description of the Related Art

For the current universal serial bus (USB) 3.0 protocol specification, a host exchanges data with USB device through a host controller. In order to support a dual-bus USB 3.0 structure, the host controller is required to include Super-Speed USB 3.0 elements and USB 2.0 elements, so the exchanging of control, states, and data on each bus between the host and the USB device can be managed simultaneously. The host controller includes several downstream ports for Super-Speed USB 3.0 and USB 2.0. Through these downstream ports, the host can examine connection and removal states of the USB devices, manage flow control between the host and the USB devices, manage data flow between the host and the USB devices, collect state and activity statistics, and supply power to the USB devices. Due to the Super-Speed USB 3.0 elements, USB 3.0 can provide a higher transmission speed which is nearly equal to decuple of the transmission speed of USB 2.0 and higher power saving efficiency. Thus, USB 3.0 can be widely applied in peripheral devices of computers and consumer electronic products.

In support of the USB 3.0 protocol, Intel issues Extensible Host Controller Interface (xHCI) protocol which mainly describes registers and data structures between system software and hardware for providing a standard communication manner between a USB 3.0 host controller and USB 3.0 peripheral driving programs. According to xHCI protocol and USB 3.0 protocol, a USB host controller can start or stop data transmission, for example, when buffer space configured for data transmission is run out of, the USB host controller stops the data transmission and notifies a USB device of the situation, then the USB device is switched to perform another data transmission or waits to perform the same data transmission after the USB host controller allocates buffer space.

In an upstream cycle/input transmission process, after a buffer in a current USB host controller receives enough input data from a USB device, the conventional USB host controller can calculate a cyclic redundancy check (CRC) result by using all input data and then combine the calculated CRC result with the all input data used for the CRC result calculation to form a data packet. Thus, when the buffer in the USB host controller receives the input data from the USB device, a bus of the USB host controller configured for transmitting data to a host is idle, resulting in lower usage rate of the bus and lower entire speed of data transmission. Moreover, the data stored in the buffer can not be transmitted to a system memory of the host immediately. Thus, when an upstream cycle/input transmission fails or is malfunctioned, if the USB device continuously transmits input data to the buffer in the USB host controller, buffer overrun of the USB host controller is easily induced.

BRIEF SUMMARY OF THE INVENTION

An exemplary embodiment of a data transmission method for a universal serial bus (USB) host controller is provided. The data transmission method includes steps of: receiving an input data of a data packet; calculating a cyclic redundancy check (CRC) result of the input data and simultaneously transmitting the input data to a system memory of a host; determining whether the input data is the last input data of a data packet; when it is determined that the input data is the last input data of the data packet, calculating the CRC result of the last input data of the data packet and accumulating the CRC result of the data packet; and combining the accumulated CRC result with the last input data and transmitting to the system memory of the host.

An exemplary embodiment of a universal serial bus (USB) host controller is provided and includes a protocol transformation module, a transmission module, a buffer manager, and a direct memory access (DMA) controller. The protocol transformation module receives input data and calculates a cyclic redundancy check (CRC) result. The transmission module receives the input data from the protocol transformation module and generates an input buffer request. The buffer manager allocates a buffer according to the input buffer request to temporarily store the input data. The DMA controller transmits the input data stored in the buffer to a system memory of a host. The protocol transformation module transmits the input data to the transmission module simultaneously when the protocol transformation module calculates the CRC result of the input data. The protocol transformation module also determines whether the input data is the last input data of a data packet. When the protocol transformation module determines that the input data is the last input data of the data packet, the protocol transformation module calculates the CRC result of the last input data of the data packet and accumulates the CRC result of the data packet and combines the accumulated CRC result with the last input data and transmits the combination to the transmission module.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
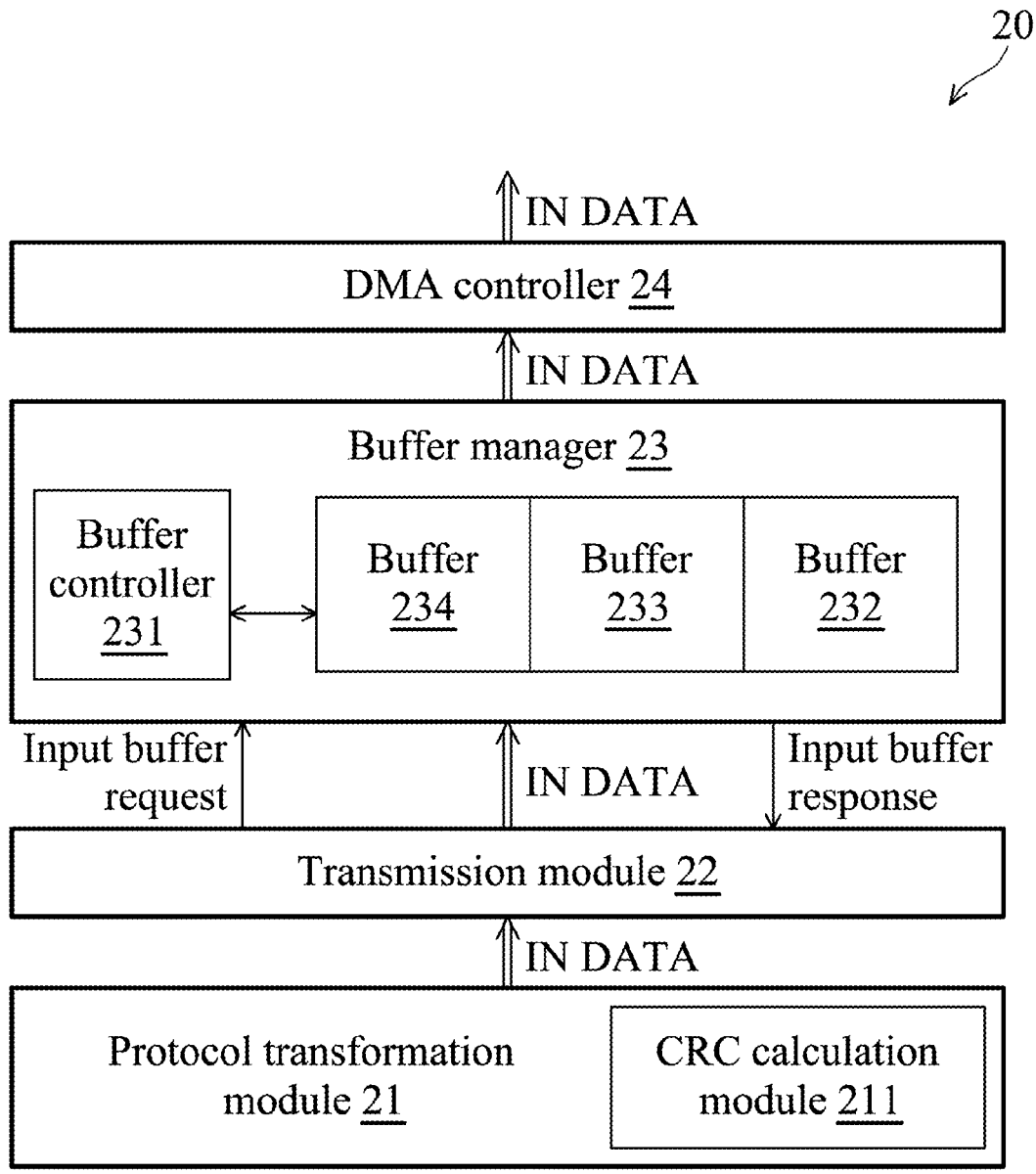
FIG. 1 is an exemplary embodiment of a USB host controller according of the present invention.

The following description is of the best-contemplated mode of carrying out the invention. This description is made for the purpose of illustrating the general principles of the invention and should not be taken in a limiting sense. The scope of the invention is best determined by reference to the appended claims.

Exemplary embodiments of the invention will be described by referring to the drawings. In the drawings, the same reference numbers represent the same elements. Moreover, in the specification, when a process or method is disclosed or described, steps of the method can be performed in any order or at the same time, except for when the context describes that one of steps depends on another previously performed step. Further, there is an obvious interval between two steps.

FIG. 1 is an exemplary embodiment of a USB host controller according of the present invention. As shown in FIG. 1, a USB host controller 20 includes a protocol transformation module 21, a transmission module 22, a buffer manager 23, and a direct memory access (DMA) controller 24. The protocol transformation module 21 is configured to receive input data and analyzes the input data IN DATA, and, simultaneously, a cyclic redundancy check (CRC) calculation module 211 in the protocol transformation module 21 calculates a CRC result of the input data IN DATA. Moreover, the protocol transformation module 21 transmits the received input data IN DATA to the transmission module 22 immediately. After receiving the input data IN DATA from the protocol transformation module 21, the transmission module 22 transmits an input buffer request to the buffer manager 23. The buffer manager 23 includes a buffer controller 231 and a buffer array including multiple buffers. In the embodiment, the buffer array includes three buffers 232, 233, and 234. The buffers 232-234 can be implemented by static random access memories (SRAMs). After the buffer manager 23 receives the input buffer request from the transmission module 22, the buffer controller 231 allocates buffer space for data to be input and transmits an input buffer response, which indicates that the buffer array has already been allocated to the transmission module 22.

Figure 2:
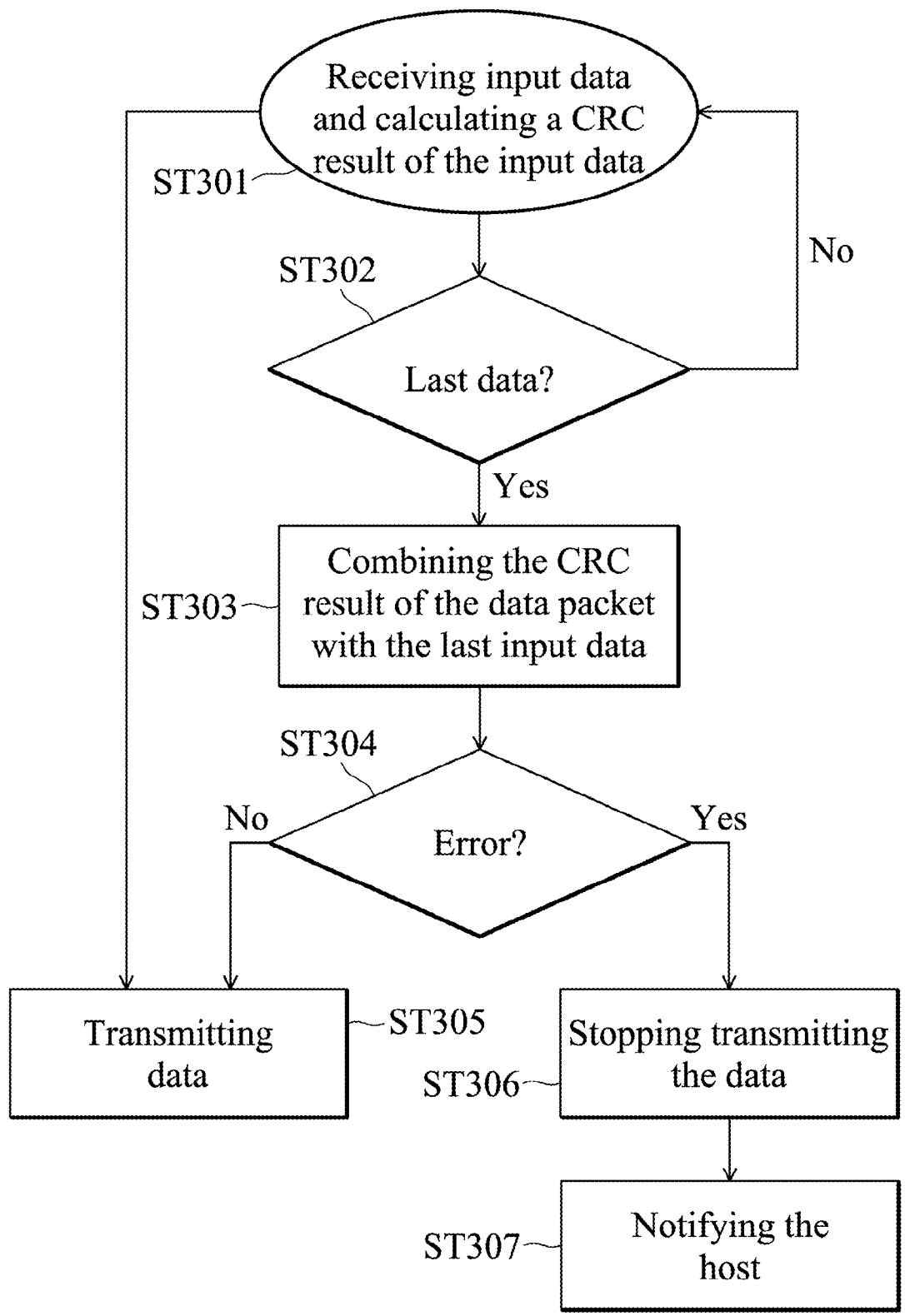
FIG. 2 is a flow chart of an exemplary embodiment of a data transmission process according of the present invention.

FIG. 2 is a flow chart of an exemplary embodiment of a data transmission process according of the present invention. As shown in FIG. 2, first, a host (not shown) communicates with a USB device (not shown), and the host transmits an input data request (IN Request) to the USB device through the USB host controller 20. The USB device transmits input data to the USB host controller 20 in response to the input data request. In step ST301, the protocol transformation module 21 of the USB host module 20 receives and analyzes the input data, and the CRC calculation module 211 calculates a CRC result of the input data. Then, the data transmission process proceeds to step ST302. In step ST302, the protocol transformation module 21 determines whether the received input data is the last data of one data packet. If the transformation module 21 determines that the received input data is not the last data of one data packet, the process returns to step ST301, and the USB host module 20 continuously receives the subsequent input data of the data packet. The CRC calculation module 211 calculates a CRC result of the subsequent input data of the data packet and accumulates it with the previous CRC result. In the embodiment, accumulating with the previous CRC result comprises performing a XOR operation.

As described above, the USB host controller receives the input data from the USB device by size of one byte or one double-word, and each data packet usually includes a fixed amount of input data. Thus, when the protocol transformation module 21 receives one data packet, steps ST301 and ST302 are repeatedly performed. During this period, the USB host controller can simultaneously perform step ST305. That is, the protocol transformation module 21 can transmit the received input data to the transmission module 22, and the transmission module 22 can transmit an input buffer request to the buffer manager 23. After the buffer controller 231 allocates buffer space for the data to be input, the buffer manager 23 transmits an input buffer response to the transmission module 22. The transmission module 22 transmits the received input data to the corresponding buffer in response to the input buffer response.

Moreover, in the embodiment, the buffer controller 231 calculates the amount of data received by the buffer array. When the amount of received data in the buffer array reaches a predetermined threshold value, the buffer controller 231 transmits the data in the buffer array to the DMA controller 24. The predetermined threshold value can represent 1, 2, 3, 4, . . . , or n data packets or 1 k, 2 k, 4 k, or 8 k-bit data. The input data is transmitted to a system memory through the DMA controller 24.

If the protocol transformation module 21 determines that the received input data is the last data of one data packet in step ST302, the process proceeds to step ST303. In step ST303, the CRC result of the last input data of the data packet is calculated and the CRC result of the data packet is accumulated. The accumulated CRC result is combined with the last input data and the combination is transmitted to the transmission module 22. Then, the process proceeds to step ST304. In step ST304, the buffer controller 231 determines whether the received data packet includes an error. The error includes at least one of the fault in the calculated CRC result and the fault representing the incomplete data packet. If the buffer controller 231 determines that the received data packet includes an error, the process proceeds to step ST306. In the embodiment, the buffer controller 231 checks if the CRC result combined in the last input data correct in ST304. In step ST306, the buffer manager 23 is notified to stop transmitting the data related to the data packet comprising the error. And, in step ST307, the host is notified that the data packet which was transmitted previously includes an error. If the buffer controller 231 determines that the received data packet does not include an error, the buffer manager 23 is notified to continuously transmit the last data with the CRC result of the data packet to the system memory in step ST305. In the embodiment, the buffer manager 23 is notified to transmit remain input data in buffers of the buffer array to the system memory via DMA controller when the amount of received data in the buffers of the buffer array reaches a predetermined threshold value. After flushing the data in the buffer(s) of the buffer array to the system memory, buffer manager 23 releases the buffer(s) in the buffer array for a subsequent transaction.

Figure 3:
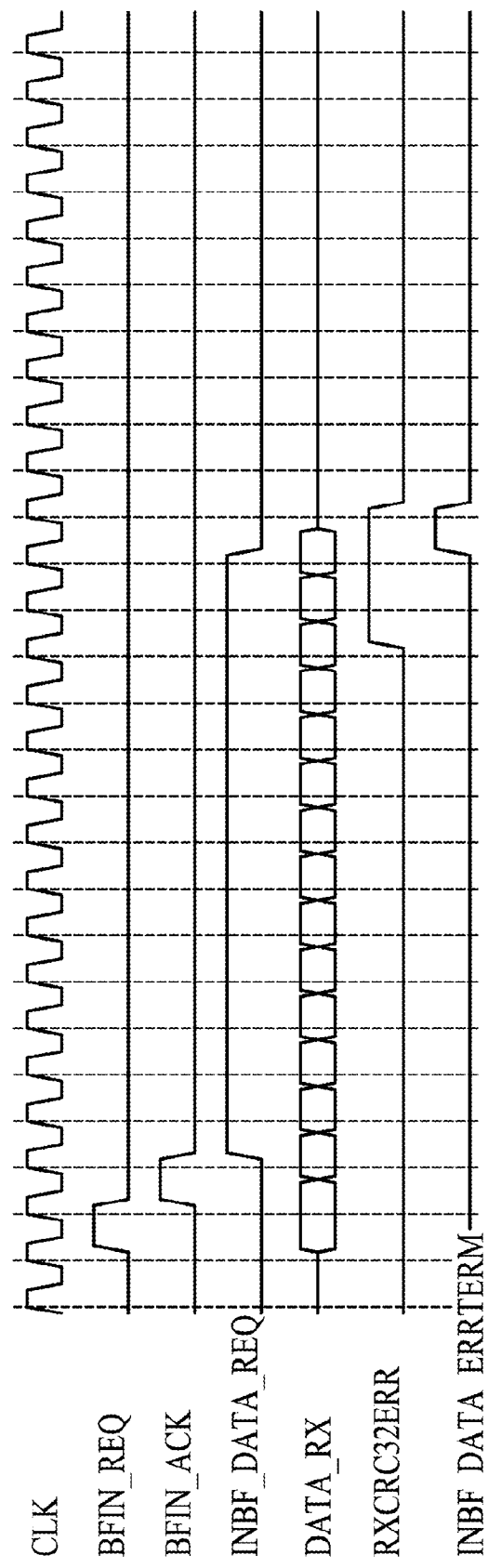
FIG. 3 is a timing chart of error occurrences during data transmission in an exemplary embodiment according of the present invention.

FIG. 3 is a timing chart of error occurrences during data transmission in an exemplary embodiment according of the present invention. In the timing chart, CLK represents clock pulses, BFIN_REQ represents a pulse of the input buffer request transmitted by the transmission module 22, BFIN_ACK represents a pulse of the input buffer response transmitted by the buffer manager 23 after the buffer space is allocated, INBF_DATA_REQ represents a request pulse for inputting data into the buffer, DATA_RX represents the received input data, RXCRCERR represents a signal pulse transmitted by the buffer controller 231, which indicates that there is an error in the CRC result, and INBF_DATA_ERR-TERM represents a signal pulse which indicates that the data packet is incomplete.

Figure 4A:
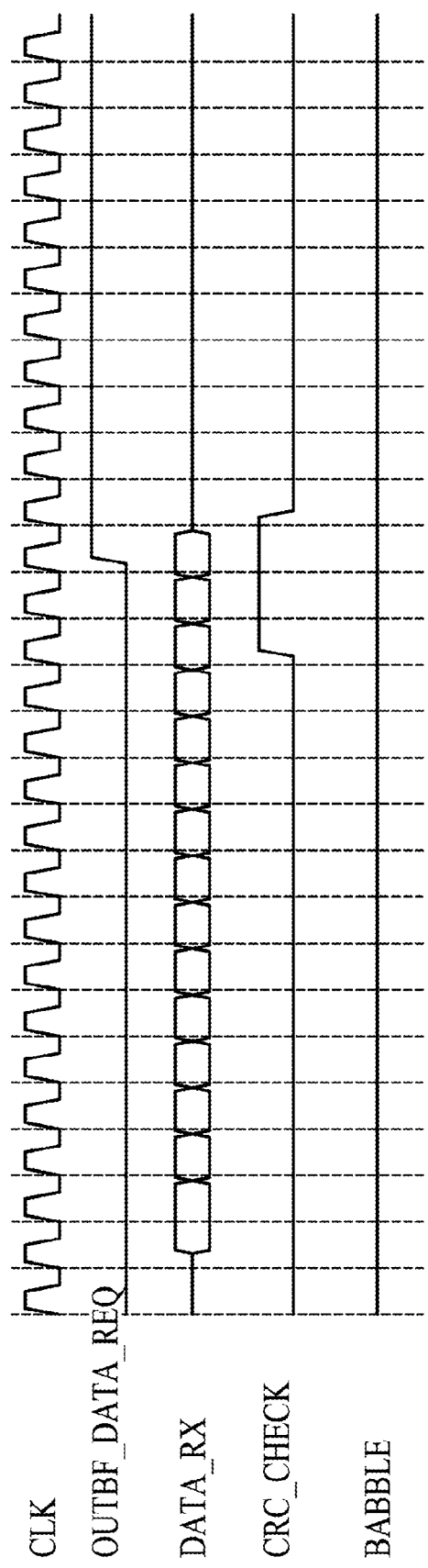
FIG. 4A is a timing chart of data transmission performed by the conventional USB host controller.
Figure 4B:
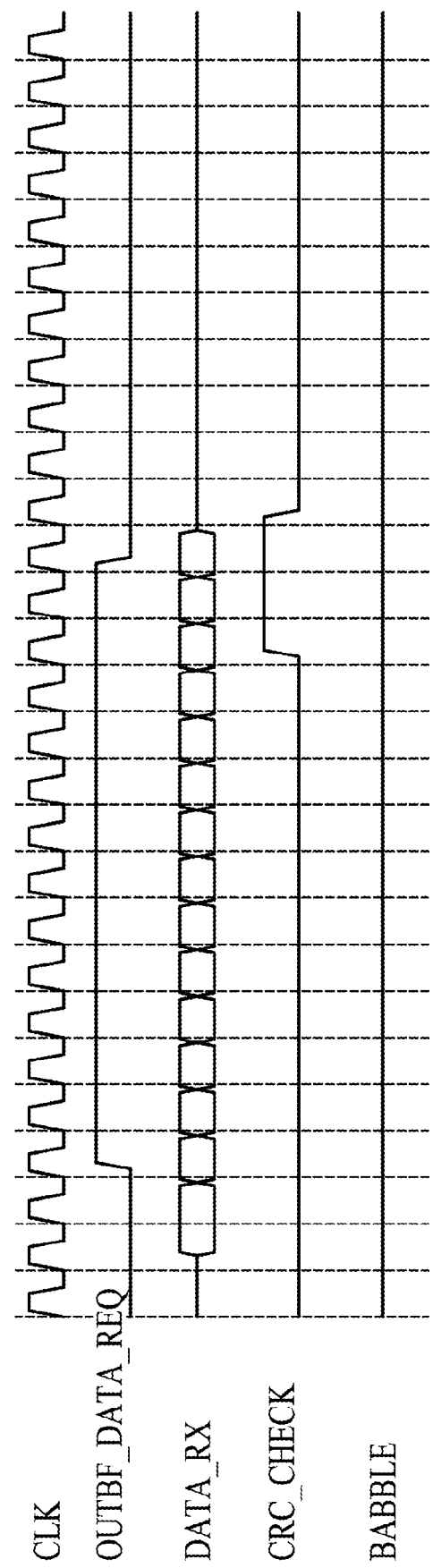
FIG. 4B is a timing chart of an exemplary embodiment of data transmission according of the present invention.

FIG. 4A is a timing chart of data transmission performed by the conventional USB host controller, while FIG. 4B is a timing chart of an exemplary embodiment of data transmission according of the present invention. In FIGS. 4A and 4B, OUTBF_DATA_REQ represents a request signal pulse of request the data in the buffer to be transmitted to the DMA controller. In some situations, the request signal pulse can indicate the occupation of the upstream data bus. CRC_CHECK represents a pulse which indicates that it is checked and determined whether the CRC result is correct. By comparing the time points of OUTBF_DATA_REQ in FIGS. 4A and 4B, it is understood that the time point when the data is transmitted from the buffer to the DMA controller according to the data transmission in FIG. 4B is much earlier than the time point when the data is transmitted from the buffer to the DMA controller according to FIG. 4A. In other words, according to the exemplary embodiment in FIG. 4B, during the data transmission, after the USB host controller begins receiving input data, the upstream data bus is quickly occupied. However, in FIG. 4A, the upstream data bus is occupied only when the process of transmitting the entire data packet, transmitted to the USB host controller, is almost finished. Thus, compared with FIG. 4A, the USB bus usage rate in the embodiment in FIG. 4B is better.

Moreover, in the embodiment, after the USB host controller receives input data, the USB host controller then immediately transmits data to the system memory. Thus, the response time for processing the upstream cycle/input transmission is shortened. Even if an error occurs in the upstream cycle of the data transmission, the USB device can transmit data continuously without buffer overflow occurring.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data transmission method for a universal serial bus (USB) host controller, comprising:
   receiving an input data of a data packet;
   calculating a cyclic redundancy check (CRC) result of the input data and simultaneously transmitting the input data to a system memory of a host;
   determining whether the input data is the last input data of a data packet;
   when it is determined that the input data is the last input data of the data packet, calculating the CRC result of the last input data of the data packet and accumulating the CRC result of the data packet; and
   combining the accumulated CRC result with the last input data and transmitting to the system memory of the host.

2. The data transmitting method as claimed in claim 1, further comprising:
   when it is determined that the input data is not the last input data of the data packet, a subsequent input data is continuously received; and
   calculating a CRC result of the subsequent input data and accumulating with the previous CRC result, and, simultaneously, transmitting the subsequent input data to the system memory of the host.

3. The data transmitting method as claimed in claim 1, wherein step of transmitting the input data of the data packet to the system memory comprises:
   temporarily storing the input data in a buffer in the USB host controller; and
   through a direct memory access (DMA) controller, transmitting the input data stored in the buffer to the system memory.

4. The data transmitting method as claimed in claim 3, further comprising:
   when an amount of input data stored in the buffer has reached a predetermined threshold value, beginning to transmit the input data stored in the buffer to the system memory.

5. The data transmitting method as claimed in claim 4, wherein size of the predetermined threshold value is a number of bits or a number of data packets.

6. The data transmitting method as claimed in claim 1, further comprising:
   determining whether the data packet comprises an error; and
   when it is determined that the data packet comprises an error, stopping the transmission of data related to the data packet by the USB host controller and notifying that the data packet transmitted previously to the system memory comprises an error.

7. The data transmitting method as claimed in claim 1, wherein the size of the input data is one byte or one double-word.

8. A universal serial bus (USB) host controller comprising:
   a protocol transformation module for receiving input data and calculating a cyclic redundancy check (CRC) result;
   a transmission module for receiving the input data from the protocol transformation module and generating an input buffer request;
   a buffer manager for allocating a buffer according to the input buffer request to temporarily store the input data; and
   a direct memory access (DMA) controller for transmitting the input data stored in the buffer to a system memory of a host,
   wherein the protocol transformation module transmits the input data to the transmission module simultaneously when the protocol transformation module calculates the CRC result of the input data, and the protocol transformation module determines whether the input data is the last input data of a data packet, and
   wherein when the protocol transformation module determines that the input data is the last input data of the data packet, the protocol transformation module calculates the CRC result of the last input data of the data packet and accumulates the CRC result of the data packet and combines the accumulated CRC result with the last input data and transmits the combination to the transmission module.

9. The USB host controller as claimed in claim 8, wherein when the buffer manager determines that an amount of input data stored in the buffer has reached a predetermined threshold value, the DMA controller begins to transmit the input data stored in the buffer to the system memory.

10. The USB host controller as claimed in claim 9, wherein size of the predetermined threshold value is a number of bits or a number of data packets.

11. The USB host controller as claimed in claim 8, wherein when the protocol transformation module determines that the input data is not the last input data of the data packet, the protocol transformation module continuously receives a subsequent input data of the data packet and calculates a CRC result of the subsequent input data and accumulating with the previous CRC result, and transmits the subsequent input data to the transmission module simultaneously.

12. The USB host controller as claimed in claim 8, wherein the buffer manager further determines whether the data packet comprises an error, and when the buffer manager determines that the data packet comprises an error, the buffer manager stops transmitting data related to the data packet and notifies that the data packet transmitted previously to the system memory comprises an error.

13. The USB host controller as claimed in claim 8, wherein the size of the input data is one byte or one double-word.

* * * * *